United States Patent
Duncan

(10) Patent No.: US 6,367,518 B2
(45) Date of Patent: Apr. 9, 2002

(54) WASTE DISPOSAL SYSTEM

(75) Inventor: Ricky D. Duncan, Erlanger, KY (US)

(73) Assignee: Airworld Tech Corporation, Villa Hills, KY (US)

( * ) Notice: Subject to any disclaimer, the term of this patent is extended or adjusted under 35 U.S.C. 154(b) by 0 days.

(21) Appl. No.: 09/799,226

(22) Filed: Mar. 5, 2001

Related U.S. Application Data

(63) Continuation-in-part of application No. 09/425,525, filed on Oct. 22, 1999, now Pat. No. 6,196,274.

(51) Int. Cl.[7] .............................................. E03D 1/00
(52) U.S. Cl. ........................... 141/97; 141/86; 141/285; 141/383; 588/249; 588/259; 4/321; 312/1; 312/3; 134/201
(58) Field of Search ................................ 141/1, 86, 87, 141/97, 279, 285, 383, 387–389, 382; 4/321–323; 137/312–314; 588/249, 259; 312/1, 3–6; 184/1.5, 106; 220/571, 573; 134/200, 201

(56) References Cited

U.S. PATENT DOCUMENTS

| | | | |
|---|---|---|---|
| 2,576,008 A | * | 11/1951 | Gladfelter et al. ............. 312/1 |
| 3,570,503 A | | 3/1971 | DeBoliac |
| 3,858,418 A | | 1/1975 | Butler |
| 3,874,478 A | | 4/1975 | Mantell, Jr. |
| 4,114,203 A | | 9/1978 | Carolan |
| 4,550,453 A | | 11/1985 | Norman |
| 4,612,916 A | | 9/1986 | Akers et al. |
| 4,626,291 A | | 12/1986 | Natale |
| 4,695,088 A | | 9/1987 | Jensen |
| 4,817,644 A | * | 4/1989 | Holmes et al. ................ 134/6 |
| 4,820,000 A | | 4/1989 | Jacobson |
| 4,883,102 A | * | 11/1989 | Gabrielyan et al. ......... 141/387 |
| 4,911,191 A | | 3/1990 | Bain |
| 5,017,197 A | | 5/1991 | McGuire et al. |
| 5,062,871 A | * | 11/1991 | Lemon, III ................. 134/200 |
| 5,080,701 A | | 1/1992 | Howard et al. |
| 5,121,776 A | | 6/1992 | Kovach |
| 5,262,578 A | | 11/1993 | Hall |
| 5,379,810 A | | 1/1995 | Marino |
| 5,685,771 A | * | 11/1997 | Kleppen ........................ 312/1 |
| 5,725,009 A | * | 3/1998 | Mallow, Sr. et al. ........ 137/312 |
| 5,890,226 A | | 4/1999 | Snedeker et al. |
| 5,960,907 A | | 10/1999 | Chau |
| 6,241,328 B1 | * | 6/2001 | Ziff ............................... 312/1 |

OTHER PUBLICATIONS

*Lavatory Drain Coupling*, Kaiser Electroprecision.
*Portable Water Fill Coupling*, Kaiser Electroprecision.

* cited by examiner

*Primary Examiner*—J. Casimer Jacyna
(74) *Attorney, Agent, or Firm*—Wood, Herron & Evans, L.L.P.

(57) ABSTRACT

The present invention provides a waste disposal system through the use of a bag 14 with removable glove members 20, 22, a removable and replaceable splash shield 17, a drain line tube 32, and a refill tube 48 in order to service aircraft lavatories. Through the use of the bag 14, the ramp attendant, the aircraft ramp, baggage and other property on the ramp is protected from contamination with human waste and chemical solutions used to deodorize and sanitize aircraft lavatories.

33 Claims, 6 Drawing Sheets

WASTE DISPOSAL SYSTEM

CROSS-REFERENCE TO RELATED APPLICATION

The present invention is a continuation-in-part of U.S. patent application Ser. No. 09/425,525, filed Oct. 22, 1999 by the same inventor and having the same assignee as the present application, now U.S. Pat. No. 6,196,274, which application is expressly incorporated by reference herein in its entirety.

FIELD OF THE INVENTION

The present invention relates generally to an apparatus and method for the disposal of waste from an aircraft and replenishment of sanitary chemical solutions to the aircraft during servicing of an aircraft lavatory.

BACKGROUND OF THE INVENTION

Presently, the removal of human waste and replenishing of lavatory solutions during the servicing of an aircraft is a manual operation. A ramp attendant uses a system of hoses, couplings and storage tanks to drain human waste, including fecal matter, from the aircraft lavatory and to refill the lavatory with a chemical solution, referred to as "blue solution." The blue solution used to fill the storage tanks of the aircraft lavatory generally includes water, perfumes and/or other chemical ingredients that reduce the smell of the human waste. An example of such a mixture is formaldehyde and methanol, which neutralizes the harmful effects of the human waste.

Human waste, whether combined with perfumes or the chemicals used as components of the blue solution, is a hazardous material. Additionally, the blue solution itself is a hazardous material. As such, any contact of human waste or blue solution with human persons, their clothing and other property should be avoided. However, resulting from the apparatus and method due to the consequent lack of protection currently used for servicing aircraft lavatories, there exists the potential for the blue solution and human waste to spill onto the attendant or tarmac during servicing of the aircraft. This spillage may also come into contact with other persons in the vicinity of the aircraft lavatory or with property, such as baggage, which may be associated with the aircraft. Additionally, persons and property may come into contact with blue solution or human waste remaining on an airport tarmac following servicing of an aircraft. Thus, there are significant risks, not the least which are health hazards, for anyone whose person or property contacts the blue solution or human waste.

Regarding the method currently used to service an aircraft lavatory, an attendant places a service cart/truck in proximity to an access panel for the aircraft lavatory. The service cart/truck includes storage tanks that waste will be deposited to and blue solution will be pumped from. The access panel is generally located underneath or on the side of the aircraft. This access panel is usually secured with thumb snaps, which are compressed, allowing the door to open upon release. Following the placement of the service cart/truck, the ramp attendant, wearing latex gloves as a precautionary measure, opens the access panel. Tubing associated with storage tanks of the aircraft lavatory is accessible behind the access panel. Valves are operatively connected to these tubes to effect their opening and closing. The tube and valve system of the aircraft includes a rinse/refill tube having a male flange, a waste tube having a male flange, and a T-handle. By manipulating T-handle, all waste debris inside the holding tank of the aircraft lavatory is released and thus emptied from the aircraft through the waste tube. This waste flows to the storage tank of the service cart/truck through a drain line tube which has been connected to the waste tube of the aircraft. The service cart/truck also includes a refill tube which associates with the rinse/refill tube of the aircraft. These tubes are used to replenish the aircraft lavatory with blue solution once the waste has been discharged.

Generally, upon opening the access panel, a stream of blue solution, which almost always contains human waste, falls out of the drainage pipes in the aircraft. Often, this mixture contacts the hands and clothing of the attendant, the cart/truck and the tarmac underneath the aircraft. Depending on the type and design of the aircraft, any such contamination may spread to the cargo and baggage area near the lavatory system. If wind is blowing during servicing of the aircraft, the potential for spreading of hazardous materials increases significantly.

Following the opening of the access panel, a cap closing off the waste tube is opened. Waste drainage and/or tissue debris is located in the waste tube beyond this cap, as the contents of the lavatory holding tank drain to the lowest point. As in the case of the blue solution, this waste drainage also falls and may contact the attendant's hands, unless the ramp attendant dangerously and quickly releases the handle of the waste cap and steps blindly backwards to avoid the drainage. Such motion could result in accident and/or injury to the attendant and/or others. Occasionally, the waste release valve may have inadvertently been left open or may have opened accidentally during travel, and the waste therein streams out when the ramp attendant opens the cap of the waste tube. This results in a substantial amount of waste debris falling out of the aircraft.

After the initial flow of waste matter has stopped, the attendant will attach the waste coupling on the drain line tube extending from the cart/truck to the aircraft by rotating the head, thereby locking the coupling in place. After locking the waste coupling in place, the attendant releases the waste stored in the lavatory holding tank in order that it may flow into the drain line tube of the now attached waste disposal system. During this flow, human waste and blue solution may leak from the junction of the couplings, the drain line tube and waste tube. Any such leakage causes the exterior of the tubing and coupling to become contaminated. Additionally, this drain line tube lies on top of the service cart/truck, further exposing the entire cart/truck to waste fecal debris. Additionally, any attendant in proximity to the drainage process may come into contact with this waste leakage. The waste debris may further fall to the airport tarmac.

Once the waste has flowed into the drain line tube, the tube must be snaked or angled so the waste will be deposited into the storage tanks of the service cart/truck. As the couplings get more use, the bearings and rings start to wear. As a result, any rotation of the head causes leakage of waste debris. Also the drain line tube generally includes metal wire woven inside. This results in holes and tears in the drain line tube leading to the cart/truck, causing drips and runs as the waste is deposited into the cart/truck.

After the waste is deposited into the cart/truck, the ramp attendant disconnects the waste coupling and steps back quickly and returns the drain line tube and coupling to the cart/truck. The attendant waits until the remaining drips of waste have stopped and then locks the waste cap back in place. This leakage may also result in the contamination of persons and property.

After all waste has been drained from the aircraft, the ramp attendant connects the coupling of the refill tube to the rinse/refill flange of the aircraft and locks it into place in a manner similar to the waste coupling. The attendant walks to the cart/truck and turns on a switch on a pump to refill the lavatory with the blue solution. The amount of blue solution used will vary by aircraft, but can amount up to 25 gallons. Following refill, the attendant stops the pump and unlocks the fill coupling from the aircraft, and, as in the case of the waste drainage, blindly and in a backward motion tries to escape being hit with the refill blue solution as it drains back out of the aircraft. After the backwash flow of the blue solution is emptied onto the tarmac with the attendant hazards of contacting persons and/or property, the agent places the refill tube back onto the cart/truck and locks the cap back onto the rinse/refill tube of the aircraft.

The ramp attendant finally closes the lavatory access panel, and removes the latex gloves and pulls away to the next aircraft. As the ramp attendant pulls away, there is human waste and blue solution left behind on the tarmac and on the cart/truck, as well as on the clothes of the attendant. Waste debris may also remain on the cargo and baggage near the aircraft, and on other persons such as airport personnel. Any waste or blue solution on the tarmac may remain until it rains or the material evaporates.

As can be seen from the above discussion, the current method of servicing aircraft lavatory systems results in the deleterious spread of human waste, such as urine and fecal material, along with blue solution to humans and property. Contact with such hazardous material could potentially have several harmful effects. Thus, it would be desirable to have a system for servicing aircraft lavatories with minimal splashing of human waste onto ramp attendants, property and the tarmac of airports. Additionally, it would be desirable to have a system which minimizes contact of blue solution with attendants, property and the tarmac. Finally, it would be desirable to have a system which would not subject the environment to risks of hazardous materials.

SUMMARY OF THE INVENTION

The apparatus and method for servicing an aircraft lavatory of the present invention solves the problems and eliminates the drawbacks of current methods of servicing aircraft lavatories as developed in the background of the invention. The apparatus used in the present invention surrounds a defined workspace in order to facilitate the disposal of the waste while preventing the waste from contacting persons and property outside the workspace. In particular, the apparatus includes a flexible bag which, in use, is placed over the access panel of the aircraft in order to catch any waste debris or blue solution that may fall from the holding tank tubes. The apparatus also includes first and second orifices disposed in the bag. Gloves are attached to these openings whereby a ramp attendant can place his/her hands into the gloves in order to service the aircraft lavatory within the workspace defined by the bag. Also located to the interior of the bag is a drain line tube. A refill tube from a service cart/truck may be disposed in the interior of the bag by extending it through a refill tube port disposed in the bag. Each of these tubes passes through an opening in the bag and are connected to the waste and refill tanks of a service cart/truck. The drain line tube and the refill tube include female couplings which are compatible with male couplings located within the interior of the aircraft. A refill switch is connected to the refill tube and operates a pump in order to replenish the aircraft lavatory with blue solution. The opening in the bottom of the bag is heat sealed around the drain line tube. At least one drain port hole is disposed in the drain line tube in proximity to the base of the bag so that any waste material which falls into the bag will thereafter be drained into the drain line tube by way of these port holes to be subsequently deposited into the waste storage tank on the service cart/truck. In addition to a waste storage tank, the service cart/truck includes a storage tank for blue solution which is connected to the refill tube.

The bag member used in the apparatus is a protective heat sealed bag and includes a transparent face shield along with the continuous drain line tube and refill tube that extend from the waste coupling to the storage tank of the service cart/truck. The bag forms a trap, which catches any falling waste debris and/or blue solution from the open waste and refill flanges of the aircraft during servicing of the aircraft lavatory.

In use, the attendant puts on a pair of latex gloves and positions the service cart/truck near the lavatory access panel located on the fuselage of the aircraft. As a result, the tanks are placed in close proximity to the access panel of the aircraft in order to reduce wear on other components of the waste disposal apparatus, thereby reducing leakage of waste material and blue solution.

Following the positioning of the cart/truck, the attendant opens the access panel exposing the waste flange, refill flange and T-handle. The attendant then places his/her hands in the gloves attached to the bag and positions the open top of the bag against the aircraft and surrounding the exposed flanges and T-handle. The attendant opens the cap of the waste flange, thereby allowing all waste debris to fall into the trap created by the positioning of the bag. The attendant couples the drain line tube to the waste flange, then pulls the T-handle so that waste will drain through the drain line tube and into the waste storage tank of the service cart/truck. The waste debris which has fallen into the bag will proceed to the lowest point of the bag which is heat sealed against the drain line tube extending from the interior of the bag to the service cart/truck. The portion of the drain line tube to which the interior of the bag is sealed contains drain port holes whereby waste will drain from the interior of the bag into the drain line tube. Thus the problem of contamination of persons and property with waste matter is greatly reduced.

Following the drainage of waste, the attendant disconnects the waste coupling allowing it to fall into the bag and closes the waste flange cap. The attendant then attaches the refill coupling of the refill tube which has been extended through the refill tube port to the rinse/refill flange located within the aircraft. The switch to operate the refill pump is connected to the bag for convenience so the attendant does not need to lower the bag and remove his/her hands from the gloves, which would increase the chances of contamination. The attendant then fills the storage tank of the aircraft lavatory with blue solution and following filling disconnects the refill coupling from the flange, allowing all spillage and backwash of blue solution to fall into the trap, into the waste tube and into the tank in one motion.

Because the bag is sealed and the gloves are sealed to the bag, there is a very small likelihood that liquid or small debris can escape the bag. This keeps the human fecal debris and blue solution from contacting the tarmac, the attendant, the baggage, the cargo and other property. Likewise the falling debris is not susceptible to spread from wind. Following drainage of all waste into the cart/truck the attendant places the bag into the cart/truck and returns to the aircraft and closes the lavatory access panel. As the attendant pulls the cart/truck away there is no evident sign that the lavatory has been serviced, due to the fact that there is minimal or no liquid or solid debris on the ramp, the tarmac, or attendant.

DETAILED DESCRIPTION

Figure 2:
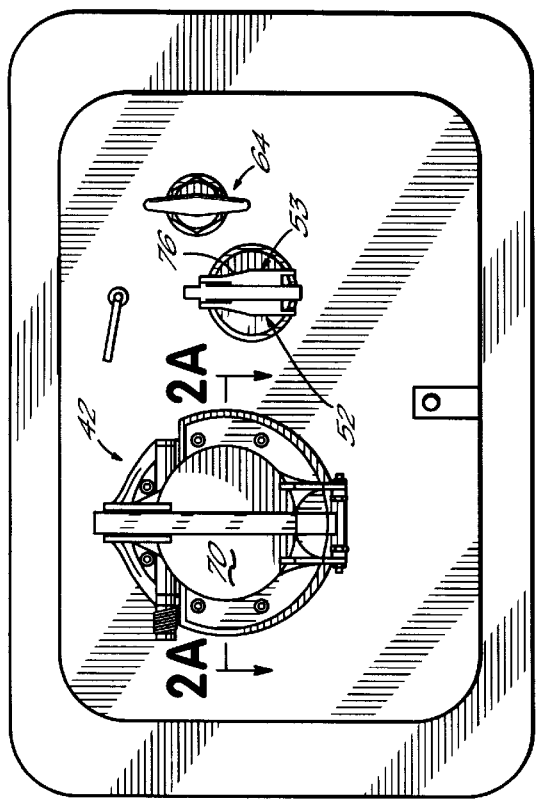
FIG. 2 is a perspective view of the tubing system of an aircraft lavatory showing a waste tube with a hinged valve cover, a refill line tube, and a T-handle for opening the valve of the waste tube and refill tube.
Figure 2A:
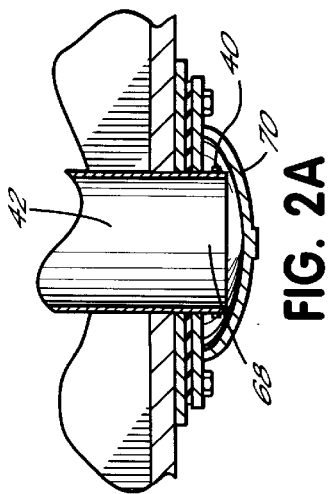
FIG. 2A is a cross-sectional view of the waste tube of an aircraft lavatory taken along lines 2A—2A of FIG. 2.

Referring to FIGS. 1–4, the apparatus 10 of the present invention provides a containment mechanism for trapping human waste, such as fecal debris and the like, and blue solution located in a lavatory storage tank (not shown) of an aircraft 12 or other transportation (i.e., buses, trains, etc.), thereby preventing contact of waste and blue solution with persons and/or property. Particularly referring to FIG. 3, the apparatus 10 for waste disposal includes a bag 14 which is substantially impermeable to human waste and blue solution. The bag 14, in various embodiments, may be formed of a rigid or a flexible material. The bag 14 includes an open top 16 adapted to be placed in proximity to an access panel 18 of the tanks of an aircraft lavatory for the servicing thereof. Additionally, the apparatus 10 of the present invention includes glove members 20, 22 attached to openings 24, 26 disposed within the sidewall 28 of the bag 14. These glove members 20, 22 extend within the workspace 30 defined by the interior of the bag 14. The glove members 20, 22 are adapted for providing protected access to the interior of the bag 14 for the hand and arm of a user. The present invention also includes a first conduit, which is a drain line tube 32, for transporting waste, disposed on both the interior and exterior of the bag 14. The portion of the drain line tube exterior to the bag 14 is operatively connected to a waste storage tank (not shown) on a service cart/truck (not shown). This drain line tube 32 includes a coupling 38 which is compatible with a flange 40 on a waste tube 42 located behind the access panel 18 of the aircraft 12. Further, the drain line tube 32 includes at least one, but generally several port holes 44 in proximity to the base 46 of the bag 14 in order that fecal material and other waste debris trapped within the interior of the bag 14 will flow back into the drain line tube 32 and be subsequently disposed of. The apparatus 10 of the present invention may also include a refill tube port 86 disposed within the sidewall 28 of the bag 14. This port 86 allows for a second conduit, which is a refill tube 48, to be extended through the port 86 and into the workspace defined by the enclosure of the bag 14. The refill tube 48 includes a coupling 50 that is compatible with a flange 52 of a rinse/refill tube 53 located behind the access panel 18 of the aircraft 12. The refill tube 48 further includes a refill line switch 54 operatively connected to a pump (not shown) used to transport chemical solutions, such as blue solution, through the refill tube 48.

Figure 1:
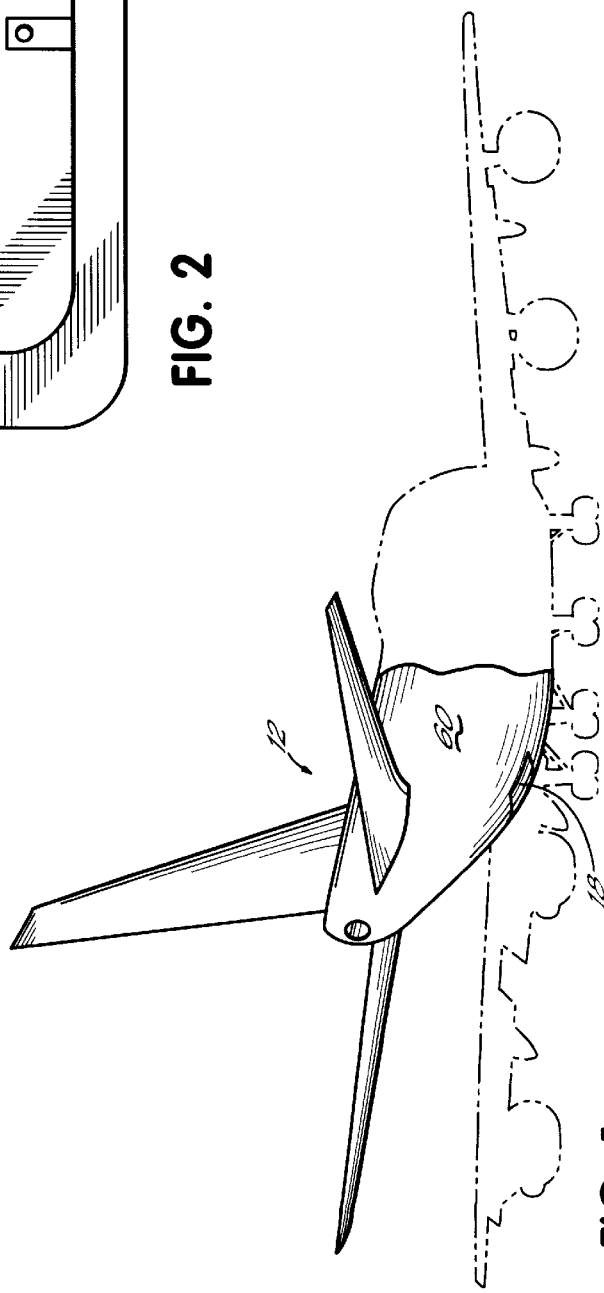
FIG. 1 is an environmental view of the access panel of a lavatory tank located on the fuselage of an aircraft.

Referring now to FIG. 1, an access panel 18 for servicing a lavatory is depicted on the fuselage 60 of an aircraft 12. This access panel 18 may be located underneath the fuselage 60 or on the side of the fuselage 60. Referring to FIG. 2, the system of tubes and valves used in lavatory service is depicted. The tubes are exposed upon opening the access panel 18. These include a waste tube 42, a rinse/refill tube 53 and a T-handle 64. The waste tube 42 includes a distal end (not shown) and a proximal end 68. The distal end is operatively connected to the waste holding tank (not shown) of the aircraft lavatory. The proximal end 68 is disposed in the vicinity of the access panel 18 and includes a male flange 40 at the terminus of its proximal end 68. This flange 40 and the opening of the proximal end 68 of the waste tube 42 are covered by a waste tube cap 70 to close off the opening of the waste tube 42.

Like the waste tube 42, the rinse/refill tube 62 includes a distal end (not shown) and a proximal end 74. The distal end is operatively connected to the blue solution holding tank (not shown) of the aircraft lavatory. The proximal end 74 is disposed in the vicinity of the access panel 18 and includes a male flange 52 at the terminus of its proximal end. This flange 52 and the opening of the proximal end 74 of the rinse/refill tube 62 are covered by a rinse/refill tube cap 76 to close off the tube opening.

The T-handle 64 is operatively connected to a valve of the waste tube 42 and holding tank. When manipulated, the T-handle 64 causes the valve to open, thereby allowing the discharge of stored waste from the holding tank of the lavatory and out through the waste tube 42.

Figure 4:
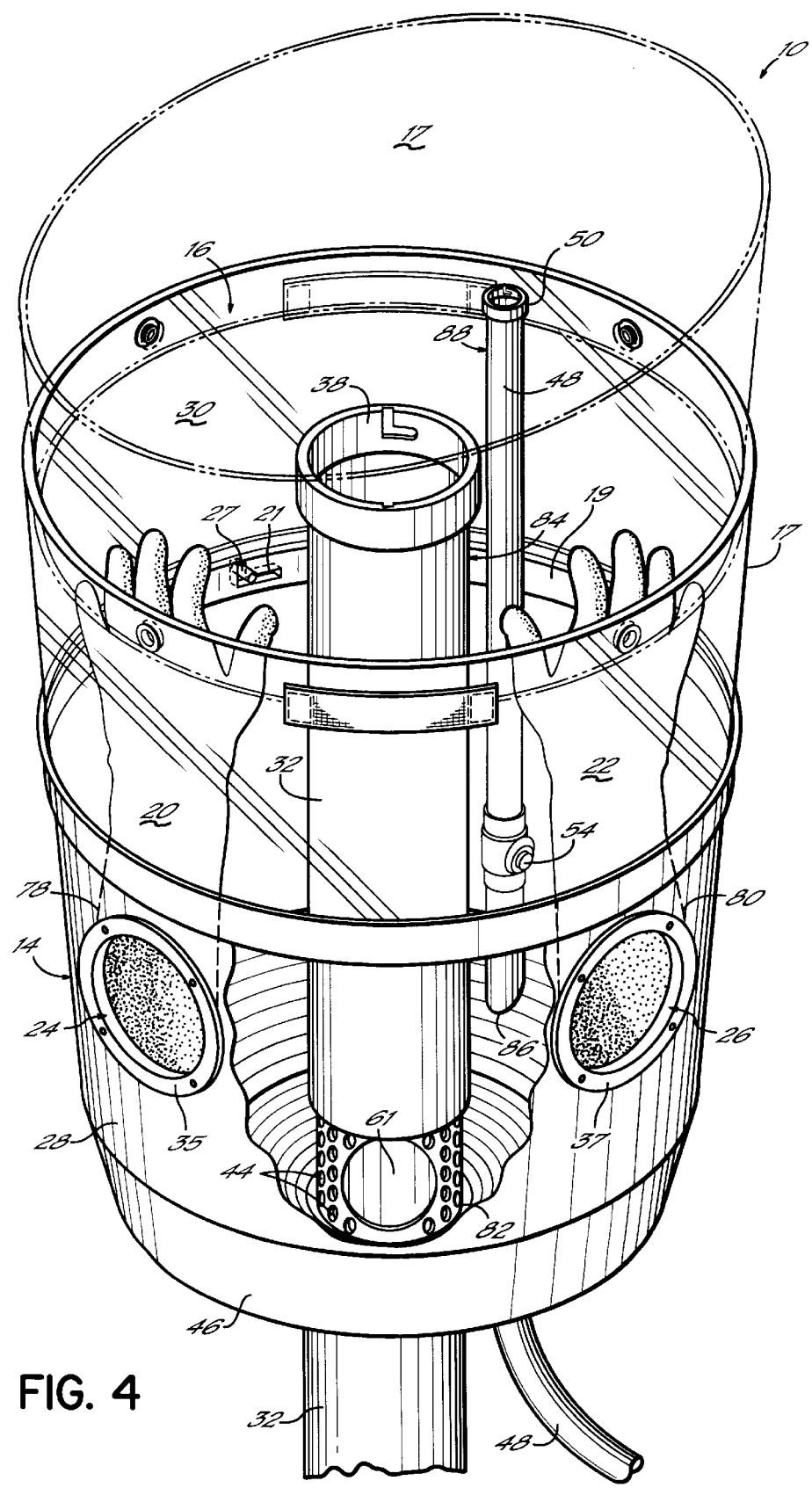
FIG. 4 is a perspective view of the waste disposal apparatus for the present invention depicting a bag including a replaceable splash shield, removable glove members, a drain line tube having drain port holes in proximity to the base of the bag, and a refill tube having a switch to activate a pump.

Referring now to FIG. 4, the bag 14 and tubing system of the present invention is shown. The bag 14 includes two basic elements: the sidewall 28 through which are disposed orifices 24, 26, and a replaceable splash shield 17. A major portion of the splash shield 17 is substantially transparent so that a user having his/her hands inserted into the glove members 20, 22 can view the workspace of the bag 14 and the area of the access panel 18 being worked upon from outside the bag 14. The splash shield 17 protects the face of the attendant while using the bag 14. In the illustrated embodiment, the splash shield 17 is formed of a transparent, flexible sheet plastic which is substantially impermeable to waste debris such as fecal material and blue solutions. However, any flexible material which is substantially impermeable to human waste debris and blue solution may be used.

The splash shield 17 of the bag 14 and tubing system of the present invention is preferably, but not necessarily, removable and replaceable. This allows for differently shaped splash shields 17 to be attached to a bag 14 in order to be compatible in shape with the differing contours of the fuselages of various airplanes.

Figure 4A:
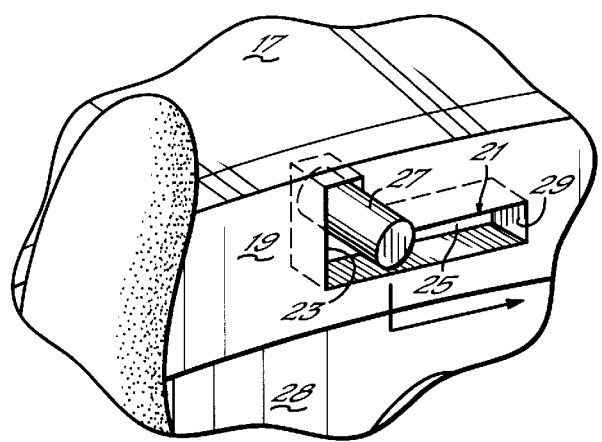
FIG. 4A is a perspective view of an L-shaped slot embodiment of the locking mechanism for the removable and replaceable shield of the present invention depicting the slot and peg in an unlocked position.
Figure 4B:
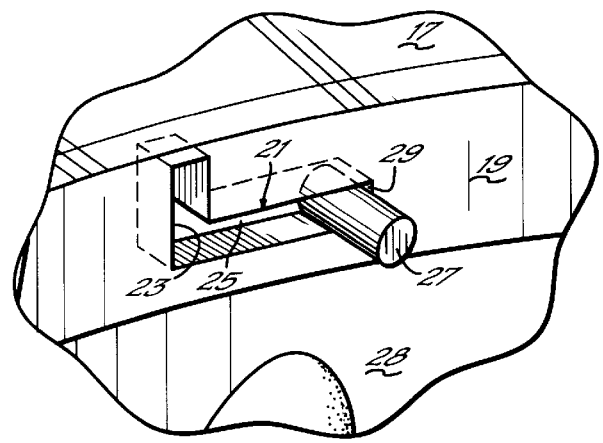
FIG. 4B is a perspective view of an L-shaped slot embodiment of the locking mechanism for the removable and replaceable shield of the present invention depicting the slot and peg in a locked position.

Referring now to FIGS. 4, 4A, and 4B, a first embodiment of a removable and replaceable splash shield 17 is shown. As described above, the splash shield 17 of the illustrated embodiment is a transparent, flexible sheet plastic which is substantially impermeable to waste debris. This splash shield 17 includes a ring member 19 which is integral with and circumferential about the base of the splash shield 17. The ring 19 is rigid and may be formed of a plastic, such as a polyurethane, a metal, or any other rigid material.

The ring 19 integral with and circumferential about the base of the splash shield 17, facilitates the connection of splash shield 17 to bag 14. The ring 19 aids in this connection by providing fasteners, orifices, or other structures which connectably engage compatible structures disposed on sidewall 28 of bag 14. In the illustrated embodiment depicted in FIGS. 4, 4A, and 4B, the ring 19 includes a plurality of orifices in the form of L-shaped slots 21 disposed in and through the ring 19 along the base of the splash shield 17. The L-shaped slots 21 include a vertical portion 23 having a longitudinal axis extending in a manner substantially perpendicular to a circumferential plane passing through the ring 19, and a horizontal portion 25 having a longitudinal axis extending in a manner substantially parallel to the circumferential plane passing through the ring 19. When the splash shield 17 is attached to the bag 14 of the present invention, the ring 19 and L-shaped slots 21 are in confronting relationship with the sidewall 28 of the bag 14. The bag 14 includes a plurality of pegs 27 disposed at intervals about the sidewall 28 of the bag 14. These pegs 27 are located proximal to the upper circumference of the open top of the sidewall 28 and protrude into the enclosure defined by the sidewall 28. During attachment, the L-shaped slots 21 of the ring 19 receive the pegs 27 and, in interlocking relationship with the pegs 27 disposed through the L-shaped slots 21 of the ring 19, connect the ring 19, and thus the splash shield 17, to the bag 14.

Alternatively, these pegs 27 may be integral with a ring (not shown) disposed about the circumference of the bag 14. This ring may be flexible or rigid and may be disposed within the lining of the bag 14. The ring may be held within the lining of the bag 14 by being sewn, glued, heat-sealed, attached by velcro, or by any other method. The pegs 27 integral with the ring are then disposed through the sidewall 28 of the bag 14.

In use, a splash shield 17 is selected to match the contour of the fuselage of a particular aircraft. The splash shield 17 is then placed in proximity to the sidewall 28 of the bag 14 such that the ring 19 of the splash shield 17 confronts the pegs 27 disposed about the circumference of the sidewall 28 of the bag 14. The ring 19 is then manipulated such that the pegs 27 extend through the vertical portion 23 of the L-shaped slots 21. The vertical portion 23 of the slots 21 allows enough room to maneuver the ring 19 so that all pegs 27 are disposed through a vertical portion 23 of an L-shaped slot 21. Next, the splash shield 17 is rotated. As rotation of the splash shield 17 continues, the pegs 27 slide along the horizontal portion 25 of the L-shaped slots 21 such that the pegs 27 are disposed through the L-shaped slots 21 along the horizontal portion 25. Rotation is halted when the pegs 27 abut the distal end 29 of the horizontal portion 25 of the L-shaped slots 21. A tight friction fit between the pegs 27, and L-shaped slots 21 prevents the splash shield 17 from disengaging from the sidewall 28 of the bag 14. In alternate embodiments of the present invention, the orifices in the ring 19 may be of shapes other than L-shaped. Additionally, in alternate embodiments of the present invention, the removable and replaceable splash shield 17 may be operatively connected to the sidewall 28 of the bag 14 by hooks, snaps, fasteners, or any other method known to those skilled in the art.

In yet another embodiment, the splash shield 17 may be provided with an additional shield extension 90 (shown in FIG. 8) to allow the splash shield 17 to be extended for use on larger aircraft. The shield extension 90 is formed of a transparent, flexible sheet plastic which is substantially impermeable to waste debris. In such an embodiment, the shield extension 90 is operatively connected to the splash shield 17 by any method apparent to those skilled in the art which allows the shield extension to be folded over and into the receptacle area defined within the splash shield 17. As shown in the embodiment illustrated in FIG. 8, one such method of connecting the shield extension and the splash shield 17 may be by a hinge 92. Thus, during normal use, the shield extension 90 is folded into the enclosure of the bag 14 and confronts the interior of the splash shield 17. When a larger splash shield is required, the shield extension 90 may be moved from its folded position to an upright position continuous with the splash shield 17.

The base 46 of the bag 14 is disposed opposite the open top 16 and forms a spill trap to which any waste material or blue solution within the bag 14 ultimately drains due to the force of gravity. The spill trap formed by the bag 14 in one embodiment has an elliptical shape with a diameter in the range of about 6 inches to 10 inches and a depth in the range of about 3 inches to 6 inches. The flexible transparent and elliptical shaped splash shield, forming the upper part of the bag 14, has a major axis in the range of about 14 inches to 18 inches and a minor axis in the range of approximately 10 inches to 14 inches. This size bag 14 is sufficient to completely encompass the necessary work area on most aircraft 12. However, the size of the bag 14 can be altered to fit other aircraft 12 or other modes of transportation (i.e., buses, trains, etc.). The bag 14 traps waste material and blue solution which does not flow directly into the drain line tube 32 and allows that waste material to drain through the port holes 44 on the drain line tube 32 inside the bag 14 to subsequently be deposited in the waste storage tank of the service cart/truck.

The glove members 20, 22 in the illustrated embodiment of the present invention are provided in the form of a pair of flexible gloves 20, 22 attached at their cuffs 78, 80 to first and second orifices 24, 26 in the sidewall 28 of the bag 14. The gloves 20, 22 are positioned to accommodate both hands of the user in a comfortable position for working on the area of the lavatory beyond the access panel 18 which is isolated by the bag 14. In the illustrated embodiment of the invention, the material of the gloves 20, 22 is a thin, flexible plastic, although it should be apparent that other conventional glove materials substantially impermeable to human waste debris and blue solution can be used. The first and second orifices 24, 26 to which are attached the pair of protective gloves 20, 22 are located in the body of the bag 14. Each glove 20, 22 is attached to its respective orifice 24, 26 by means of clamps, heat, sewing or snap rings. The gloves 20, 22 allow the user to touch all connection couplings 38, 50 inside the bag 14 while maintaining a clean operation.

Figure 5:
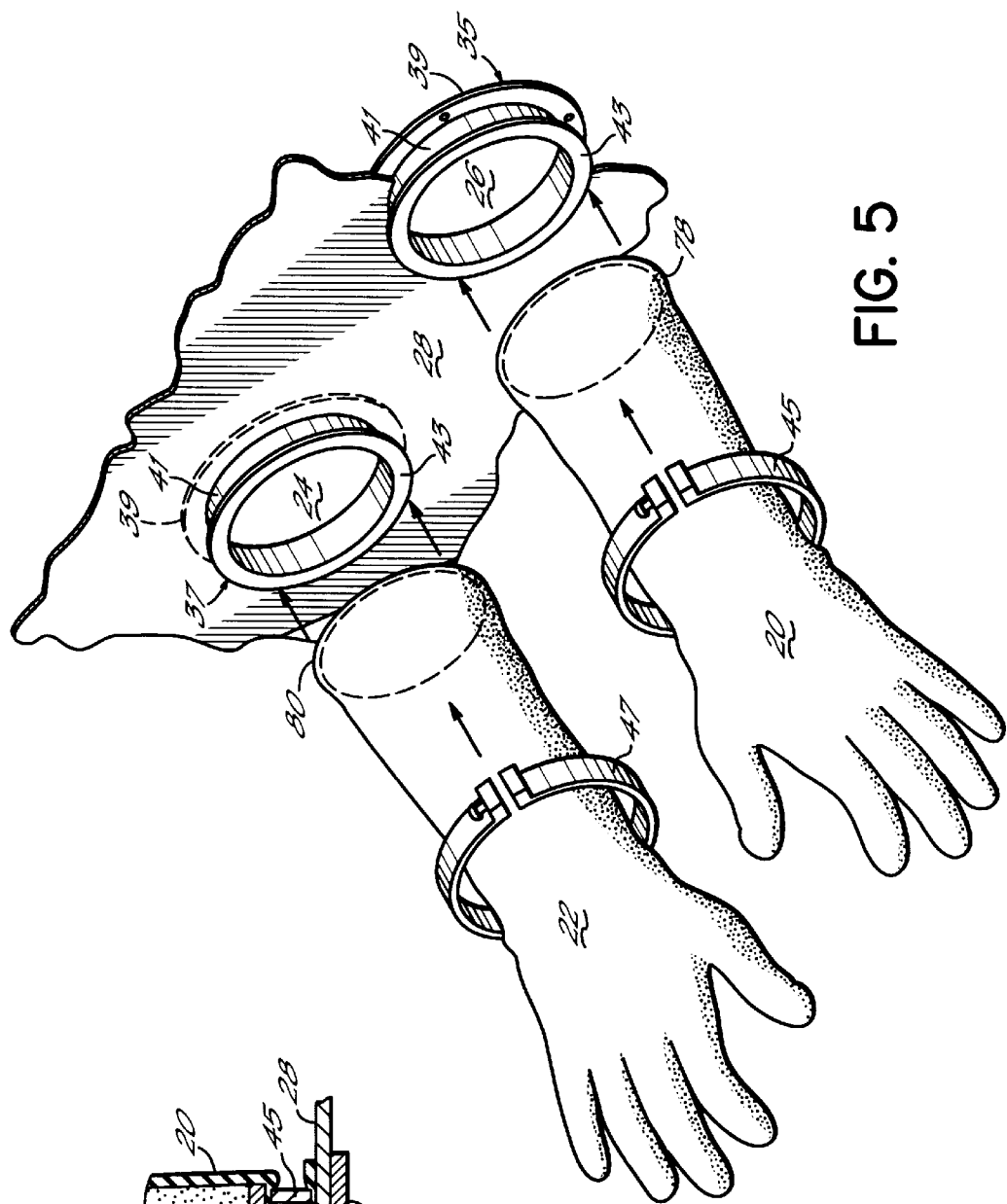
FIG. 5 is an exploded view of the removable and replaceable gloves of the present invention depicting a glove, glove base, and clamp.
Figure 6:
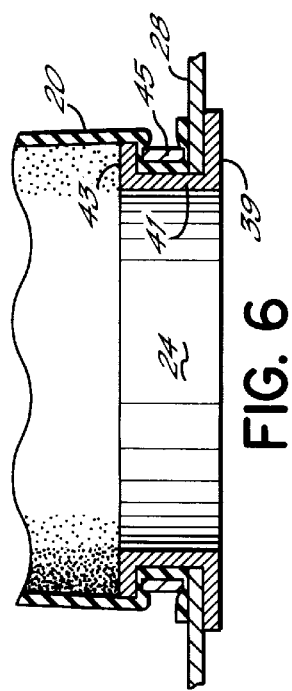
FIG. 6 is a cross-sectional view of the removable and replaceable gloves, glove base, and clamp of the present invention.

In one embodiment of the present invention, the gloves 20, 22 are removable and replaceable. Referring now to FIGS. 4, 5, and 6, a first embodiment of the removable and replaceable gloves 20, 22 are shown. In particular, first and second glove bases 35, 37 are disposed about the circumference of first and second orifices 24, 26. First and second glove bases 35, 37 include a horizontal ring member 39 and a vertical ring member 41. The horizontal ring member 39 is disposed in a manner confronting the exterior surface of the sidewall 28 of the bag 14 proximal to and circumferentially about first and second orifices 24, 26. Alternatively, the horizontal ring member 39 may be housed within and enveloped by the sidewall 28 of the bag 14. The vertical ring member 41 extends through first and second orifices 24, 26 and protrudes into the enclosure defined by sidewall 28 of bag 14. The vertical ring member 41 includes a rolled-over lip 43 which extends away from the center of first and second orifices 24, 26. Removable and replaceable gloves 20, 22 are then placed over the vertical ring members 41 of first and second glove bases 35, 37. First and second clamps 45, 47 are placed over the gloves 20, 22 and the vertical ring members 41 of first and second glove bases 35, 37, such that gloves 20, 22 are disposed between first and second glove bases 35, 37 and first and second clamps 45, 47. By tightening or loosening these clamps 45, 47, the gloves 20, 22 may be respectively operatively connected to or removed from first and second orifices 24, 26 of the bag 14. The rolled-over lips 43 of the vertical ring members 41 prevent the clamps 45, 47 from slipping off the glove bases 35, 37.

A second embodiment of the removable and replaceable gloves 20, 22 includes first and second connector rings (not shown). First and second connector rings are placed over the gloves 20, 22 and the vertical ring members 41 of the first and second glove bases, such that gloves 20, 22 are disposed between first and second glove bases 35, 37 and first and second connector rings (not shown). First and second clamps 45, 47 are then disposed circumferentially about the first and second connector rings (not shown).

Figure 3:
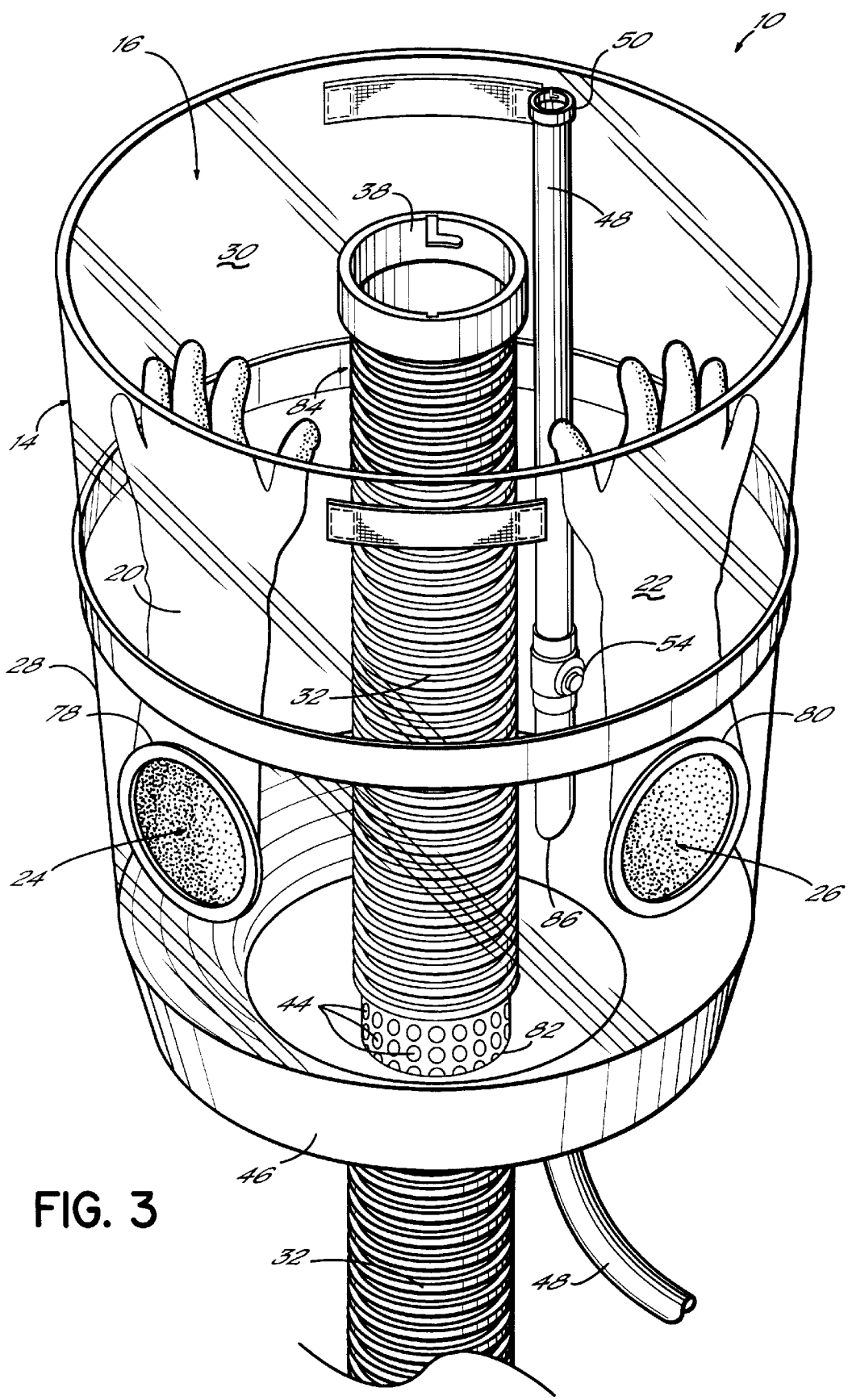
FIG. 3 is a perspective view of the waste disposal apparatus of the present invention depicting a bag including orifices having attached glove members, a drain line tube having drain port holes in proximity to the base of the bag and a refill tube having a switch to activate a pump.

As may be best seen in FIGS. 3 and 4 of the drawings, the apparatus 10 of the present invention further includes a first conduit, which is a drain line tube 32, which extends from the interior of the bag 14 to the exterior of the bag 14 by passing through an opening 82 located in the base 46 of the bag 14. In the illustrated embodiment, this drain line tube 32 is formed of a flexible material, in order that the user may easily manipulate drain line tube 32 within the bag 34 to make connection with the waste tube 42. Opening 82 is disposed substantially opposite the open top 16 of the bag 14. In the illustrated embodiment, the opening 82 is sized to match the circumference of the drain line tube 32. The bag 14 is sealed at the opening 82 in its bottom to and around the circumference of the drain line tube 32 by heat. In alternate embodiments, this material of the bag 14 around opening 82 may be attached by being sewn or snapped or by any other method which facilitates attachment. The bottom of the bag 14 tapers towards its center in order to allow a free flow of waste materials to the port holes 44 of the drain line tube 32.

The proximal end 84 of the drain line tube 32 includes a female coupling 38 which attaches to a corresponding male flange 40 on the proximal end 68 of the waste tube 42. Following this connection, the drain line tube 32 is used as a conduit to transport human waste debris and other debris from the aircraft 12 to a waste storage tank 34 on the service cart/truck 36. In the illustrated embodiment, this drain line tube 32 is generally of a round shape having a diameter in the range of approximately 4 to 4½ inches. The length of the drain line tube 32 extends throughout the bag 14 and extends to the waste tank. The length of the tube 32 will vary depending on the style of cart/truck used and, therefore, its potential distance from the aircraft 12. However, the length of the drain line tube 32 from the female coupling 38 on its proximal end 84 to the drain port holes 44 will generally range from about 16 inches to 20 inches.

Figure 7A:
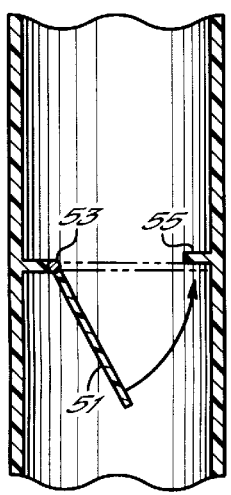
FIG. 7A is a cross-sectional view of a first embodiment of a tube adapter in accordance with the principles of the present invention taken along lines 7A—7A of FIG. 4.
Figure 7B:
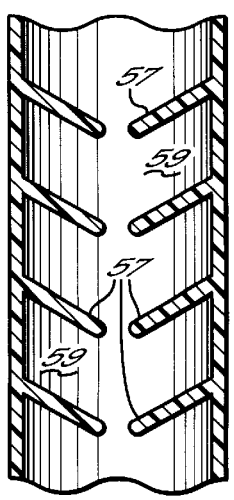
FIG. 7B is a cross-sectional view of a second embodiment of a tube adapter in accordance with the principles of the present invention taken along lines 7B—7B of FIG. 4.

In one embodiment of the invention, the drain line tube 32 of the bag 14 and tubing system of the present invention includes a tube adapter 49, as illustrated in FIGS. 7A and 7B. This tube adapter 49 operates to prevent the backflow of waste from the drain line tube 32 to the bag 14 in the event that the drain line tube 32 becomes clogged. The tube adapter 49 also includes a connector (not shown) to provide a connection fitting should a user desire to splice the drain line tube 32 below the tube adapter 49 to connect a separate drain tube and/or a check valve. The tube adapter 49 is disposed within the drain line tube 32 below the port holes 44. In a first embodiment (shown in FIG. 7A), the tube adapter 49 includes a flipper 51 which is operatively connected to the drain line tube 32 by a hinge 53 or other mechanism which allows for movement of the flipper 51. During normal flow of waste, the flipper 51 is depressed against the wall of the drain line tube 32 to allow flow of waste and debris from the aircraft to the LAV cart/truck. Should the drain line tube 32 become clogged, the force of the backflow causes the flipper 51 to move toward the proximal end 84 of the drain line tube 32. When the flipper 51 is parallel to the cross-sectional plane of the drain line tube 32, its further movement is prevented by a stopper 55 extending from the drain line tube 32. Thus, the entire path of the drain line tube 32 is closed off.

In a second embodiment (shown in FIG. 7B), the tube adapter 49 includes a plurality of flexible ridges 57 disposed along the interior of the drain line tube 32 at a downward angle. These ridges 57 allow for the passage of waste and debris from the aircraft to the service cart/truck. However, upon the backflow of waste, the angle of the ridges 57 prevents all but a minimal amount of debris from reentering the bag 14 because the backflow of waste becomes trapped in the interstices 59 between successive ridges 57 of the adapter 49.

The drain port holes 44 are located in the vicinity of the base 46 of the bag 14 and are disposed through the drain line tube 32 within the interior workspace 30 of the bag 14. These port holes 44 are predrilled during fabrication of the bag 14 and, in the illustrated embodiment, are approximately ¼ of an inch in diameter and are positioned in rows of 6 to 10 drain port holes 44 spaced approximately 1 inch apart around the circumference of the drain line tube 32. In the illustrated embodiment, the drain line tube 32 is comprised of a flexible material such as plastic and can form a straight, 45, or 90° angle toward the waste storage tank of the service cart/truck. Thus, the flexibility of the drain line tube 32 allows for its positioning to enhance the efficiency of deposition of waste material into the storage tank. An alternate embodiment of the present invention (depicted in FIG. 4) may include at least one larger port hole 61 of 2½ inches in diameter disposed through the drain line tube 32. This larger port hole 61 allows for the transport of larger debris which falls into the spill trap back into the drain line tube 32.

The bag 14 of the illustrated embodiment further includes a refill tube port 86 disposed in its sidewall 28. This port 86 allows a second conduit, which is a refill tube 48, as may be found on any service cart/truck, to be disposed through the interior of the bag 14 by extending though port 86. In the illustrated embodiment, this refill tube 48 is formed from a flexible material, in order that a user may easily manipulate the refill tube 48 for connection to the rinse/refill tube 53. In the illustrated embodiment, the port 86 is sized to match the circumference of the refill tube 48. The refill tube 48 is not an integral part of the apparatus 10, but may be disposed through port 86 and into bag 14 in order that bag 14 may catch any blue solution which falls from access panel during replenishment of aircraft storage tanks. In an alternative embodiment, the bag 14 is sealed at the port 86 in its bottom to and around the circumference of the refill tube 48 by heat. In this embodiment, refill tube 48 may be an integral part of apparatus 10. In other alternate embodiments, this material of the bag 14 around the opening 82 may be sewn or snapped or connected by any other method in order to facilitate the attachment.

In an alternative embodiment (not shown), the refill tube 48 may be used without a separate refill tube port 86 disposed through the bag 14. Rather, both drain line tube 32 and refill tube 48 may extend from the interior of the bag 14 to the exterior of the bag 14 with both tubes being disposed through a single opening in the base of the bag 14. In this configuration, refill tube 48 may run along the outside of drain line tube 32 or, alternatively, may be disposed at least partially within drain line tube 32.

The proximal end 88 of the refill tube 48 includes a female coupling 50 which attaches to a corresponding male flange 52 on the proximal end 74 of the rinse/refill tube 53. Following this connection, the refill tube 48 is used to transport blue solution from the holding tanks of the service cart/truck to the aircraft 12. In the illustrated embodiment, this refill tube 48 is generally of a round shape having a diameter in the range of approximately 1 inch to 1½ inches. The length of the refill tube 48 extends throughout the bag 14 and extends to the holding tank of the service cart/truck. The length of the tube 48 will vary depending on the style of cart/truck used and, therefore, its potential distance from the aircraft 12. However, the length of the refill tube 48 from the female coupling 50 on the proximal end 88 to the base 46 of the bag 14 will generally range from about 16 inches to about 20 inches.

Additionally, the refill tube 48 also includes a refill tube switch 54 or valve which may be operatively connected to a pump in order to activate the pump to discharge blue solution from the storage tank on the cart/truck through the refill tube 48 and into the lavatory of the aircraft 12 following removal of human waste. Upon activation, the lavatory of the aircraft 12 is refilled with blue solution. In the illustrated embodiment, refill tube switch 54 is an automatic switch. However, it will be appreciated that in alternate embodiments of the invention, switch 54 may be a manual switch. The switch 54 may be in the form of a button, toggle, marine-type or other waterproof switch 54 disposed within the interior of the bag. Alternatively, the switch 54 may be disposed on the exterior of the bag or may be located on a foot pedal easily accessible to the user during refilling of aircraft storage tanks with blue solution. In yet another alternative embodiment, the switch 54 may be operatively connected to the interior of the bag and have a wire, such as an electrical wire, adapted to connect with a second wire extending from the pump. The connection between pump wire and switch wire may occur at the bag interface in order to operatively connect the switch 54 to pump. The location of the switch 54 inside bag 14 prevents the user from having to remove his/her hands from the workspace to activate a switch on the cart/truck.

In use a ramp attendant places his/her hands in the gloves 20, 22 attached to the bag 14 and positions the open top 16 of the bag 14 against the aircraft 12 so as to surround the exposed waste tube 42, rinse/refill tube 53, and T-handle 64. The attendant then opens the cap 70 of the waste tube 42, thereby allowing all waste debris to fall into the trap created by the positioning of the bag 14. The attendant then couples the drain line tube 32 to the waste flange 40, by placing the female coupling 38 of the drain line tube 32 over the male flange 40 of the waste tube 42 and rotating the coupling 38 to lock the drain line tube 32 and waste tube 42 together. Following this coupling the attendant then pulls the T-handle 64 so that waste will drain through the drain line tube 32 and into the waste storage tank of the service cart/truck. The waste debris which has fallen into the bag 14 will proceed to the lowest point or base 46 of the bag 14, which is heat sealed against the drain line tube 32. At the junction of the drain line tube 32 and base 46 of bag 14, any waste which has fallen into the interior of the bag 14 will drain into port holes 44 disposed in drain line tube 32 and subsequently to the service cart/truck.

Following the drainage of the waste from the aircraft lavatory, the attendant disconnects coupling 38 allowing it to fall into bag 14. The attendant then closes the waste tube cap 70. Attendant then attaches coupling 50 of refill tube 48 located within bag 14 to the rinse/refill male flange 52 by rotating and thereby locking the tubes together. Still operating within the interior of the bag 14, the attendant then activates switch 54 to start the refill pump in order to replenish the aircraft lavatory tanks with blue solution. Thus, the attendant does not need to lower the bag 14 and remove his/her hands from the gloves 20, 22, which would increase the chances of contamination. Following the filling of the storage tank of aircraft lavatory with blue solution, the attendant disconnects the refill coupling 50 from the flange 52, allowing all spillage and backwash of blue solution to fall into the bag 14, into the drain line tube 32 and subsequently into the tank of the service cart/truck.

Figure 8:
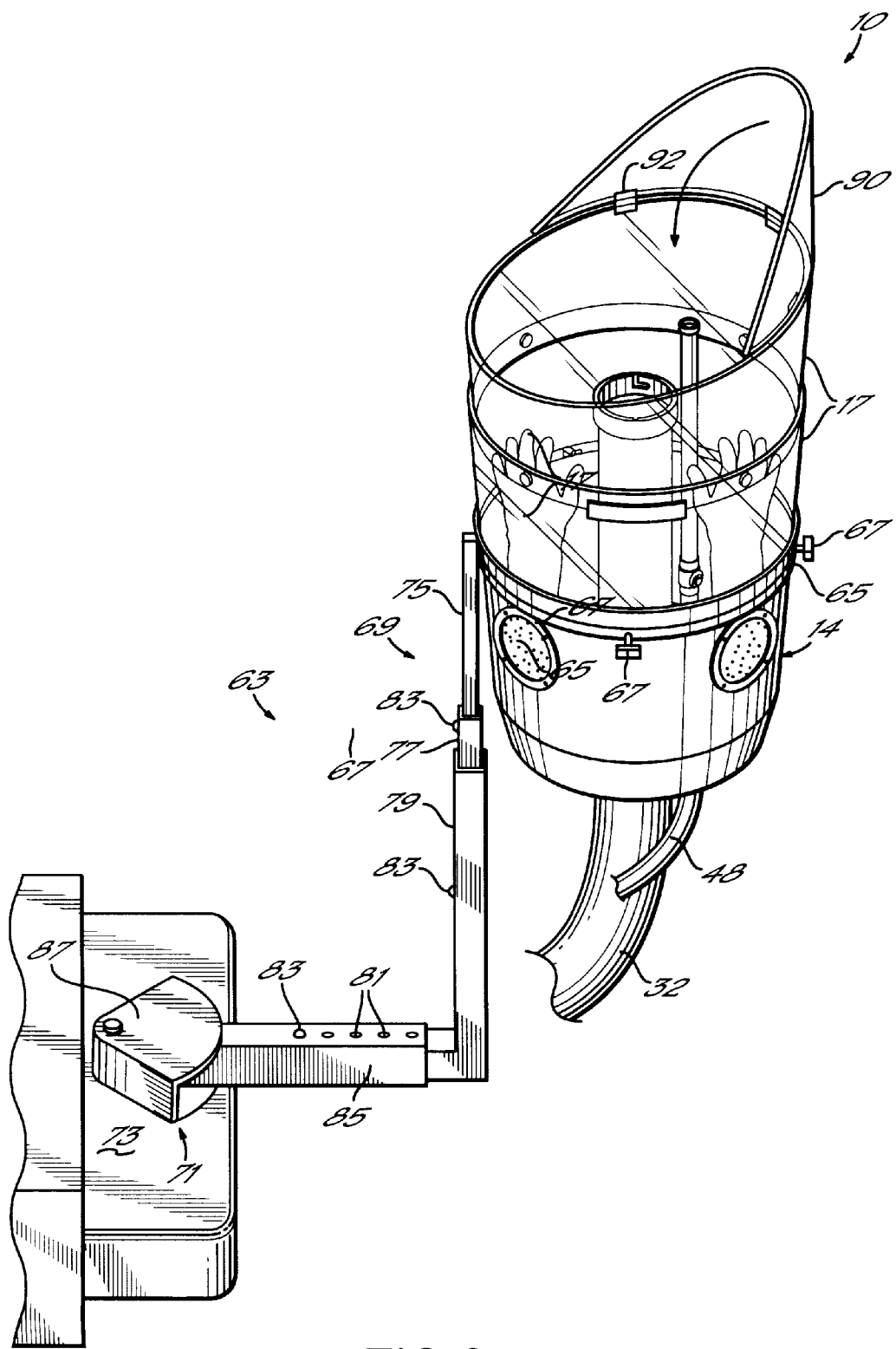
FIG. 8 is a perspective view of the waste disposal apparatus of the present invention in combination with a stand.

Referring now to FIG. 8, in another aspect of the present invention, the flexible bag 14 and tubing system may be supported by a stand 63 to bear the weight of the apparatus 10 and further facilitate its use. During use, waste is received by the enclosure of the bag 14. As the weight of the bag 14 increases, it becomes more difficult for a ramp attendant to hold the bag 14 against the fuselage of an aircraft. Should the bag 14 fall away from the aircraft, waste may spill to the tarmac or to individual workers, thereby resulting in the hazards described in the background of the invention.

The stand 63 may be operatively connected to the back of a service cart/truck in one embodiment and is adjustable for use with any model of aircraft. In particular, the stand 63 includes a ring 65 having braces 67 for restraining the bag, an adjustable vertical stand 69, a swivel mechanism 71 for allowing lateral rotational movement of the stand, and platform 73 on which an attendant may stand.

More specifically the ring 65 is made of metal or any other material of sufficient rigidity to support the bag 14 of the present invention. The ring 65 has a circumference of sufficient size to hold and support the flexible bag 14. The ring 65 includes a plurality of braces 67 disposed through the ring 65 of the stand 63. These braces 67 may be inserted into or retracted from the stand 63 during its use. The braces 67 are used to restrain the bag 14 within the stand 63. As a bag 14 is inserted into the ring 65 of the stand 63, the braces 67 are manipulated by a user to move along their longitudinal axes to contact the sidewall of the bag 14, thus preventing the bag 14 from slipping completely through the ring 65.

The vertical stand 69 is adjustable and, in the illustrated embodiment, is formed from three segments: an upper segment 75, a middle segment 77, and a lower segment 79. The upper segment 75 is operatively connected to the ring 65. The lower segment 79 is operatively connected to a platform 73. This platform 73 may include wheels operatively connected to its base to allow free movement of the platform 73 and stand 63. As described above, in one embodiment, the platform 73 may be operatively connected to a service cart/truck. The adjacent ends of the upper and middle segments 75, 77, and the middle and lower segments 77, 79 are operatively connected one to another by the use of a tightening/release mechanism. In the illustrated embodiment, the lower section 79 of the vertical stand 69 is hollow and adapted to slide over the middle section 77 of the vertical stand 69. Likewise, the middle section 77 of the vertical stand 69 is hollow and is adapted to slide over the upper section 75 of the vertical stand 69. The upper, middle, and lower sections 75, 77, 79 have a plurality of holes 81 disposed along their longitudinal length. The tightening/release mechanism includes a compression pin 83 adapted to be inserted through the holes 81 of the upper, middle, and lower segments 75, 77, 79 in order to join them one to another. In order to adjust the height of the stand, the compression pin 83 is removed from the holes 81 of the upper and middle 75, 77, and/or middle and lower 77, 79 segments. The upper segment 75 is then moved within the middle segment 77, and the middle segment 77 is moved within the lower segment 79 until a desired height is attained. Corresponding holes 81 of the upper and middle 75, 77, and/or middle and lower 77, 79 segments are aligned and the compression pin 83 is inserted into the holes 81. The stand 63 is thus retained at the proper height.

The lower segment 79 of the vertical stand 69 is operatively connected to a platform 73 on a service cart/truck. The lower segment 79 bends at a 90° angle at its base to be substantially parallel to the platform 73. This horizontal section 85 of the lower segment 79 is also adjustable as described above with respect to the upper, middle, and lower segments 75, 77, 79 of the vertical section 69 of the stand 63. In the illustrated embodiment, the distal end of this lower segment 79 is operatively connected to a mechanism 71 which allows the stand to be swivelled at its base. This lateral rotational movement obviates the need for the service cart/truck to be precisely placed under the drain hatch of the aircraft. In the illustrated embodiment, the degree of this rotational movement is limited by a swivel cover 87 which houses the distal end of the lower segment 79 of the vertical stand 69. In alternate embodiments, this swivel cover 87 may be absent so there is no limit to rotational movement of the stand 63.

It should be understood that while the present invention has been described in detail with respect to specific embodiments thereof, it should not be considered limited to such embodiments but may be used in other ways without departure from the essential features thereof.

What is claimed is:

1. An apparatus to facilitate disposal of waste while preventing waste, chemical solutions and other hazardous materials from contacting persons and objects, the apparatus comprising:
   a receptacle for catching waste;
   first and second openings disposed in said receptacle to allow a user to work within said receptacle; and
   a first conduit extending through said receptacle and attached to said receptacle for transporting waste, said first conduit including at least one hole disposed through its circumference, for draining waste from said receptacle into said first conduit.

2. The apparatus of claim 1 further including a second conduit for transporting a chemical solution.

3. The apparatus of claim 2 further including a third opening disposed in said receptacle, whereby said third opening is adapted to accept said second conduit.

4. The apparatus of claim 2 wherein said second conduit is operatively connected to said first conduit.

5. The apparatus of claim 2 further including first and second glove bases operatively connected to said receptacle.

6. The apparatus of claim 5 wherein each of said first and second glove bases each include a ring member operatively connected about the circumference of said first and second openings.

7. The apparatus of claim 6 wherein said first and second glove members are disposed over said first and second glove bases.

8. The apparatus of claim 7 further including first and second clamps adapted to be placed about the circumference of said first and second glove members and said first and second glove bases, thereby operatively connecting said first and second glove members to said receptacle.

9. The apparatus of claim 7 further including first and second connector rings, each of said first and second connector rings having a circumference greater than said ring members, said first and second connector rings adapted to be placed over said ring members such that said first and second glove members are disposed between said ring members and said first and second connector rings.

10. The apparatus of claim 9 further including first and second clamps adapted to be placed about the circumference of said first and second connector rings in order to substantially immobilize said first and second connector rings against said first and second glove members and said first and second glove bases, thereby operatively connecting said first and second glove members to said receptacle.

11. The apparatus of claim 1 further including first and second glove members removably connected to said first and second openings, whereby a user can place hands into said glove members in order to enter the enclosure of said receptacle.

12. An apparatus to facilitate disposal of waste while preventing waste, chemical solutions and other hazardous materials from contacting persons and objects, the apparatus comprising:
   a bag including an open top and having a sidewall defining an enclosure;
   a removable splash shield operatively connected to said sidewall;
   first and second orifices disposed in said sidewall of said bag;
   first and second glove members operatively connected to said first and second orifices, whereby a user can place hands into said glove members in order to enter the enclosure of said bag; and
   a first conduit extending through said bag and attached to said bag for transporting waste, said first conduit including at least one hole disposed through its circumference, for draining waste from said bag into said first conduit.

13. The apparatus of claim 12 further including a second conduit for transporting a chemical solution.

14. The apparatus of claim 13 further including a third orifice disposed in said bag, whereby said third orifice is adapted to accept said second conduit.

15. The apparatus of claim 13 wherein said second conduit is operatively connected to said first conduit.

16. The apparatus of claim 13 further including a shield extension operatively connected to said removable splash shield.

17. The apparatus of claim 16 wherein said shield extension is adapted to be disposed within the enclosure formed by said sidewall of said bag and said removable splash shield when said shield extension is in a first position, and wherein said shield extension is further adapted to be disposed outside of the enclosure formed by said sidewall of said bag and said removable splash shield when said shield extension is in a second position.

18. The apparatus of claim 12 wherein said sidewall of said bag further includes a plurality of pegs operatively connected to said sidewall proximal to said open top and protruding into said enclosure defined by said sidewall.

19. The apparatus of claim 18 wherein said splash shield further includes a ring disposed circumferentially about the base of said splash shield.

20. The apparatus of claim 19 wherein said ring includes a plurality of orifices disposed through said ring for engaging a plurality of pegs.

21. The apparatus of claim 20 said plurality of orifices being a plurality of L-shaped slots disposed through said ring, each of said L-shaped slots having a vertical section and a horizontal section, said vertical section extending substantially perpendicular to the circumferential plane of said ring and said horizontal section extending substantially parallel to the circumferential plane of said ring.

22. The apparatus of claim 21 wherein said pegs extend through said L-shaped slots of said ring such that said L-shaped slots engage said pegs in interlocking fashion, thereby operatively connecting said splash shield to said sidewall of said bag.

23. In combination, an apparatus to facilitate disposal of waste while preventing waste, chemical solutions and other hazardous materials from contacting persons and objects and a stand for supporting said apparatus, wherein said apparatus comprises:

a receptacle for catching waste having first and second openings disposed in said receptacle to allow a user to work within said receptacle, and a first conduit extending through said receptacle and attached to said receptacle for transporting waste, said first conduit including at least one hole disposed through its circumference for draining waste from said receptacle into said first conduit.

24. The combination of claim 23 wherein said apparatus further includes a second conduit for transporting a chemical solution.

25. The combination of claim 24 further including a third opening disposed in said receptacle, whereby said third opening is adapted to accept said second conduit.

26. The combination of claim 24 wherein said second conduit is operatively connected to said first conduit.

27. An apparatus to facilitate disposal of waste while preventing waste, chemical solutions and other hazardous materials from contacting persons and objects, the apparatus comprising:

a receptacle for catching waste;

first and second openings disposed in said receptacle to allow a user to work within said receptacle;

a first conduit extending through said receptacle and attached to said receptacle for transporting waste, said first conduit including at least one hole disposed through its circumference, for draining waste from said receptacle into said first conduit; and an adapter, whereby said adapter prevents backflow of waste from said first conduit into said receptacle.

28. The apparatus of claim 27 further including a second conduit for transporting a chemical solution.

29. The apparatus of claim 28 further including a third opening disposed in said receptacle, whereby said third opening is adapted to accept said second conduit.

30. The apparatus of claim 28 wherein said second conduit is operatively connected to said first conduit.

31. The apparatus of claim 27 wherein said adapter includes a flipper mechanism disposed within said first conduit and operatively connected to said first conduit.

32. The apparatus of claim 27 wherein said adapter includes a plurality of flexible ridges disposed along the interior of said first conduit at a downward angle.

33. The apparatus of claim 27 wherein said adapter further includes a connector, whereby said adapter can be connected to an alternate conduit.

\* \* \* \* \*